March 24, 1959

A. H. FAULKNER 2,879,411

"NOT AND" GATE CIRCUITS

Filed March 20, 1956

INVENTOR.
ALFRED H. FAULKNER
BY
ATTY.

United States Patent Office 2,879,411

Patented Mar. 24, 1959

2,879,411

"NOT AND" GATE CIRCUITS

Alfred H. Faulkner, Chicago, Ill., assignor to General Telephone Laboratories, Incorporated, a corporation of Delaware Application March 20, 1956, Serial No. 572,675

3 Claims. (Cl. 307—88.5)

The present invention relates in general to an electronic switching circuit, and specifically relates to a transistor circuit arrangement acting as a "not and" gate for replacing a differential relay of the type used for various switching or signalling operations.

A differential relay generally comprises several windings to which separate circuits are completed for energizing the respective windings. If only one winding is energized at a time, the relay contacts are closed to control an output circiut accordingly, while the concurrent completion of a circuit to each winding restores the original condition of the relay contacts. Thus a discrimination may be made for the purpose of accomplishing various switching or signal functions on the basis of the control of the differential relay output circuit.

An anticoincidence or "not and" gate is a gate with two input sources. The gate circuit produces an output on the application of a pulse to either input source, but produces no output where there is no input pulse or when two coincident input pulses are provided. A gate circuit of this type is described in an article entitled "Anticoincidence or 'Not And' Gate," on page 518 of the publication entitled "The Transistor," copyright 1951 by Bell Telephone Laboratories. The aforementioned article describes a gate circuit operating on a pulse type input, which is unsuitable for use with steady D.C. type signals such as used in relay switching operations.

The transistor arrangement of the present invention is broadly a "not and" gate devised to accomplish the same functions as those performed by a differential relay. That is on the completion of one circuit to the arrangement, an output circuit is controlled accordingly, while on the completion of a concurrent second circuit to the arrangement the output circuit is caused to revert to its original condition. Further, the present circuit arrangement provides a simple and economical "not and" gate operated by input potentials of the same polarity, and which may be either a steady D.C. input or a pulse input.

Figure 1:
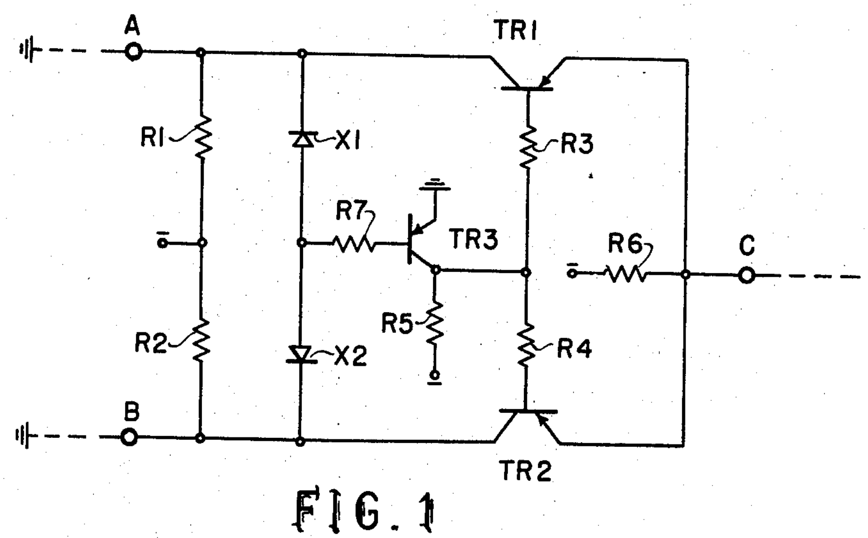
Figure 2:
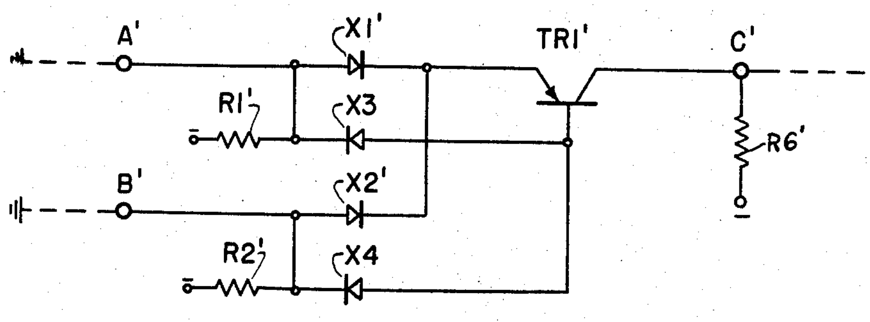

Figs. 1 and 2 disclose respective embodiments of the invention.

Referring first to Fig. 1, assume the terminals A and B respectively are unconnected to the ground potential at the left of the terminals. In this condition negative battery is supplied to the base circuit of transistor TR3 through resistor R7 from resistor R2 and rectifier X2 in shunt with resistor R1 and rectifier X1. Resistor R7 is several times greater than resistors R1 and R2, and therefore terminals A and B are each close to negative battery. As current is then flowing in the emitter collector circuit of TR3 the junction of resistors R3 and R4 is substantially at ground potential and therefore the base circuits of TR1 and TR2 respectively are near ground potential. Some current therefore flows through the respective paths of transistors TR1 and TR2 to battery connected through resistor R6 at terminal C. As resistors R3 and R4 are of relatively high value little current flows through terminal C and the output circuit connected thereto remains at substantially the negative battery potential connected to the left end of resistor R6.

If terminal A is connected to ground potential as the result of a switching or signalling operation, the collector circuit of TR1 swings to substantially ground potential. TR3 remains conductive as negative battery is still supplied to its base circuit through R2 and X2 while rectifier X1 blocks the application of ground potential to the base circuit. In this condition current flows through the collector emitter circuit of TR1, through resistor R6 to negative battery and terminal C swings from negative battery to substantially ground potential to provide a signal on the output circuit connected to terminal C. The same procedure occurs if terminal B had been connected to ground potential instead of terminal A with the exception that TR1 remains non-conductive and TR2 conducts as its collector circuit swings to substantially ground potential.

With both terminals A and B connected to ground potential, TR3 is cut-off as no potential exists between its base and emitter circuits. The collector circuit of TR3 therefore swings to negative battery. This negative battery is applied through resistors R3 and R4 respectively to the base circuits of TR1 and TR2 respectively and both are biased to cut-off. Terminal C now swings back to substantially negative battery potential to provide that potential to the ouput circuit.

Referring now to Fig. 2 wherein the second embodiment of the invention is disclosed. It will be seen that with terminals A′ and B′ unconnected to ground, transistor TR1′ is nonconductive and terminal C′ which is connected to a source of negative battery through a resistor R6′ remains at that potential. With ground connected to either terminal A′ or terminal B′ that potential is transmitted through rectifier X1′ or rectifier X2′ respectively to the emitter circuit of TR1. The ground potential at A′ is blocked from the base circuit of TR1′ by rectifier X3, while battery is supplied thereto from resistor R2′ and rectifier X4. In the event terminal B′ is at ground, that potential is transmitted through rectifier X2′ to the emitter circuit of TR1′, while battery through resistor R1′ and rectifier X3 holds the base circuit of TR1′ negative with respect to the emitter circuit. Current in either event flows in the emitter collector circuit of TR1′ and terminal C swings to substantially ground potential to provide an output corresponding to the input condition.

When both terminals A′ and B′ are concurrently at ground potential, no potential difference exists between the emitter base path of TR1′ for causing conduction therein as the right end of resistors R1′ and R2′ respectively are both at ground potential. Terminal C′ therefore returns to battery thereby providing an output corresponding to the input condition.

Thus having described several embodiments of my invention, but not wishing to limit myself thereto, I am appending hereto a series of claims, the terminology of which I believe encompasses the scope of the invention. For example the term electronic valve used frequently in the following claims will be understood to include transistors, semi conductors or electronic tubes of which many types are available for use in the present invention.

What is claimed is:

1. A gate circuit having a pair of input terminals and the improvement comprising a transistor with a base, emitter and collector circuit, a pair of rectifiers, a pair of resistors, one end of each resistor being individually connected through a respective one of said rectifiers to said base circuit and the other ends of each rectifier being connected to a source of potential, another pair of rectifiers individually connecting said emitter circuit to said one end of each resistor and to said input terminals whereby a potential on one said input terminals conditions said collector circuit in one manner and a potential on both said input terminals conditions said collector circuit in another manner.

2. A circuit arrangement comprising a transistor with a collector circuit, a base circuit and an emitter circuit, a pair of input terminals, a unidirectional circuit connection between each input terminal and said emitter circuit, another unidirectional circuit connection between each input terminal and said base circuit, a source of potential, and a resistor connected between each other unidirectional circuit connection and said source of potential whereby the potential from said source is shunted from said base circuit only on the application of a particular potential coincidentally to both said input terminals, said transistor responding to said particular potential applied via one of said input terminals to said emitter circuit for controlling said transistor to provide a corresponding output potential in said collector circuit whereby said circuit arrangement is in one condition and another output potential provided in said collector circuit in response to said particular potential being applied coincidentally to both said input termianls for shunting said source potential from said base circuit, whereby said circuit arrangement is in another condition.

3. A circuit arrangement characterized as open when in one condition and characterized as closed when in another condition comprising a transistor having a collector circuit, a base circuit and an emitter circuit, a source of potential connected to said base circuit through a pair of parallel resistor elements and a respective unidirectional circuit element for biasing said base circuit with respect to said emitter circuit, a pair of input terminals each connected to said emitter circuit, each of said input terminals connected to said base circuit through a respective one of the unidirectional circuit elements whereby a potential of one polarity appearing at one of said input terminals shunts the potential supplied by said source through one of said resistance elements, and an output terminal in said collector circuit, said output terminal at one potential when said circuit arrangement is closed and at another potential when said circuit arrangement is open, said transistor controlled in response to a potential of one polarity appearing at one of said input terminals and transmitted to said emitter circuit for causing said output terminal in said collector circuit to assume another potential and controlled by said transistor in response to a potential of said one polarity simultaneously appearing at both input terminals for shunting from said base circuit the potential supplied by said source through both said resistance elements whereby said output terminal is at said one potential.

References Cited in the file of this patent

UNITED STATES PATENTS

| | | |
|---|---|---|
| 2,670,445 | Felker | Feb. 23, 1954 |
| 2,676,271 | Baldwin | Apr. 20, 1954 |
| 2,706,811 | Steele | Apr. 19, 1955 |
| 2,737,583 | Crooks | Mar. 6, 1956 |
| 2,757,280 | Beard | July 31, 1956 |
| 2,760,062 | Hobbs | Aug. 21, 1956 |
| 2,785,305 | Crooks et al. | Mar. 12, 1957 |
| 2,809,303 | Collins | Oct. 8, 1957 |